Patented Nov. 4, 1941

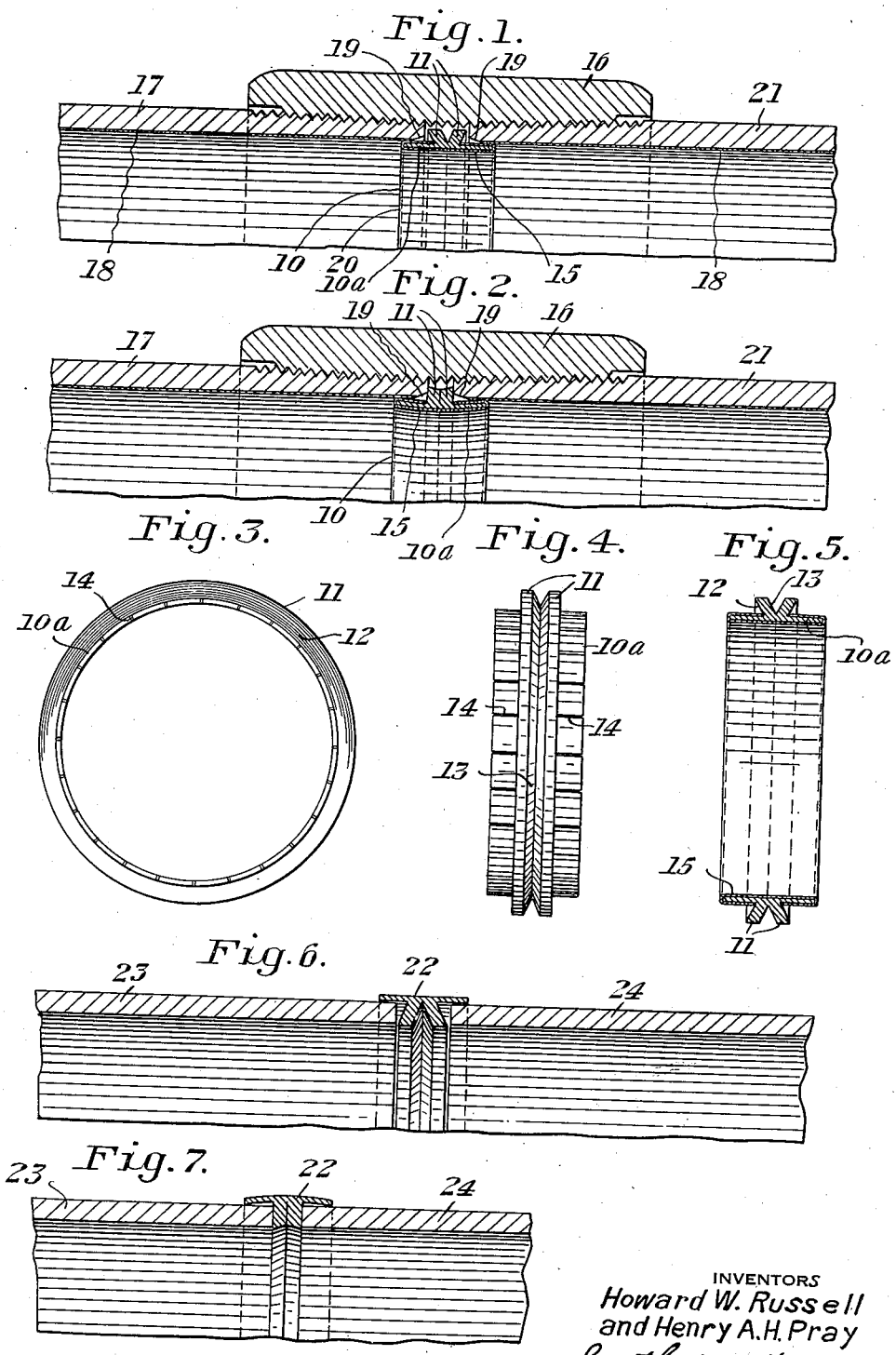

2,261,566

UNITED STATES PATENT OFFICE 2,261,566

PROTECTOR RING OR COUPLING FOR PIPE JOINTS

Howard W. Russell and Henry A. H. Pray, Columbus, Ohio, assignors, by mesne assignments, to The Youngstown Sheet and Tube Company, Youngstown, Ohio, a corporation of Ohio Application May 31, 1940, Serial No. 338,114

3 Claims. (Cl. 285—197)

This invention relates to a pipe fitting and, in particular, to a fitting adapted to serve as a protective ring at the joints between adjacent lengths of pipe having a corrosion-resistant lining.

Steel pipe lined with an organic resin provides a satisfactory conduit for fluids which would rapidly corrode unprotected steel pipe. In using such lined pipe, however, the cutting and reaming operations incident to the installation and connection thereof remove a portion of the lining adjacent the cut end, leaving a portion of the interior of the pipe open to attack by the fluids traversing it, even though the ends of adjacent pipe lengths are firmly butted together. Various expedients have been tried heretofore to make lined pipe corrosion-resistant throughout its length but none of these efforts has proved entirely successful. We have invented a novel pipe fitting which, when properly installed, protects the interior of the pipe adjacent the end where the corrosion-resistant lining is removed by the cutting and reaming operations. A preferred embodiment of our invention comprises a sleeve having a pair of spaced shoulders extending generally radially therefrom intermediate the ends of the sleeve and so arranged that when the shoulders are forced together, the ends of the sleeve are deformed radially. The fitting is provided with a corrosion-resistant coating similar to the lining applied to the interior of the pipe.

In addition to protecting the exposed portion of the interior of the pipe adjacent the end, the fitting of our invention also serves as a gasket to provide a fluid-tight joint between adjacent lengths. The fitting is also useful as a coupling, for numerous applications where a joint of high strength is not required. Further details of the invention will become apparent during the following description and explanation, and the novel features and advantages will then be particularly pointed out. The accompanying drawing illustrates preferred embodiments of the fitting designed for use as a protective ring and gasket and also as a coupling.

In the drawing,

Fig. 1 is a partial longitudinal section through a pipe joint showing the fitting of our invention in position therein;

Fig. 2 is a similar view showing the relative positions of the parts when the joint has been turned up tight;

Fig. 3 is an elevation of the fitting designed as a protective ring or gasket;

Fig. 4 is a side view thereof;

Fig. 5 is an axial section;

Fig. 6 is a view similar to Fig. 1 showing the fitting designed as a coupling; and Fig. 7 is a view similar to Fig. 6 showing the relative positions of the parts when the joint has been made.

Referring now in detail to the drawing and, for the present, to Figs. 1 through 5, the fitting of our invention indicated generally at 10, comprises a sleeve 10a having a pair of spaced, annular shoulders 11 extending generally radially therefrom, intermediate the ends of the sleeve. In the embodiment illustrated, the shoulders 11 are formed from an enlargement of the sleeve which is undercut as at 12 after which a V-shaped groove 13 is cut around the enlargement. By this procedure, the shoulders 11 diverge outwardly from the sleeve 10. The sleeve 10a is preferably slotted inwardly from opposite ends thereof as at 14 for a purpose which will appear shortly. The fitting may be made of any suitable material, e. g., steel, and when it is to be used as a protective ring in joints between lengths of lined pipe, it is provided with a corrosion-resistant coating 15 of organic resin or the like.

Figs. 1 and 2 show how the fitting is used as a protective ring. An ordinary sleeve coupling 16 is threaded onto the end of a length of lined pipe 17 and turned up tight thereon. The lining of the pipe is indicated at 18. As shown at 19, the lining is partly removed adjacent the end of the pipe by the reaming which is done after the pipe is cut to length. When the coupling 16 has been turned up tight on the pipe 17, the fitting is inserted through the open end of the coupling into about the position indicated at 20 and another pipe length 21 is threaded into the coupling. Fig. 1 illustrates the relative positions of the parts just before the pipe 21 is turned up tight into the coupling 16.

As the pipe 21 is turned up tight, the shoulders 11 are compressed between the ends of the lengths 17 and 21 and thereby forced together, as shown in Fig. 2. The collapsing of the shoulders 11 is accompanied by a radial bending of the segmental portions of the ends of the sleeve 10 between adjacent slots 14. This bending is facilitated by the presence of these slots. As clearly shown in the drawing, the sleeve 10a which has a protective coating thereon overlies the portions 19 adjacent the ends of the pipe lengths from which the protective lining 18 has been removed by reaming. It will also be apparent that the ends of the sleeve 10, being forced outwardly against the lining of the pipe lengths, establishes a fluid-tight joint therewith, in addition to protecting the exposed portions 19 from contact with fluid passing through the pipe.

The sleeve as shown in Figs. 1, 2 and 5 has a resilient coating preferably of resinous material similar to that on the interior of the pipes and this coating is continous over the outer surfaces of the ends of the sleeve as well as on the inner surface of the sleeve to protect it from corrosive liquids. This coating prevents any such liquids from passing through the slots 14 and also protects the outer reamed ends of the joined pipes.

The fitting is applicable not only to joints between adjacent pipe lengths but also to joints between a pipe length and a connection such as an elbow, T or the like. For such application, the only requirement is that the connection have a shoulder for engagement with one of the shoulders 11. This can easily be provided in practically any form of connection.

The fitting of our invention may be made of any suitable material although the steel fitting has proved quite satisfactory. It may be conveniently machined from a solid ring. The shoulders 11 are preferably thicker than the sleeve 10a and the groove 13 is fairly deep, as shown, the bottom thereof being substantially in line with the outer surfaces of the sleeve. By reason of this formation, the deformation of the sleeve takes place about a circle intermediate the bottom of the groove and the interior of the sleeve. The dimensions of the fitting, of course, are determined by the size of the pipe with which it is to be used, the outside diameter of the sleeve 10a preferably being slightly less than the inside diameter of the pipe, and the outside diameter of the shoulders 11 being slightly less than the minimum inside diameter of the coupling.

Our invention is also adapted to serve as a coupling between adjacent pipe lengths for applications where high strength is not essential. Such application of the invention, however, requires some means to deform the fitting, i. e., the function performed in the application previously described by the cooperating threads of the pipe and conventional coupling. Fig. 6 shows a modified fitting 22 disposed between the ends of pipe lengths 23 and 24. The fitting 22 is similar to that shown in Figs. 3 through 5 except that its diverging shoulders extend radially inward instead of outward. When the ends of the pipe lengths 23 and 24 are forced together, the fitting 22 is deformed to the condition shown in Fig. 7 so that the ends of the sleeve bite into the ends of the pipes, thus providing a coupling having sufficient strength for certain uses. A fitting such as that shown in Figs. 3 through 5 may also be employed in the application illustrated in Figs. 6 and 7, if the pipes 23 and 24 have a protective lining therein. The form of fitting shown at 22 may be provided with a protective coating, particularly if the pipes 23 and 24 have such coating on their exterior surface. The use of a coating on the sleeve of the fitting 22 is desirable to seal the joint between the pipe lengths.

It will be apparent that the invention has numerous advantages of considerable practical importance. In the first place, it provides protection for the portions of lined pipe from which the protective layer is removed by operations incident to installing pipe. It also provides a gasket for sealing the joint. The invention also has utility as a coupling between pipe lengths and provides a coupling which is cheaper than a threaded joint and, furthermore, may be applied to pipe having a wall too thin to permit the cutting of threads therein. While a joint made up with our fitting as a coupling has only limited strength, there are numerous applications where a high joint strength is not required. The fitting is relatively inexpensive to manufacture and, when installed, introduces but little obstruction to the flow of fluid through the pipe.

Although we have illustrated but a preferred embodiment and a modification of the invention, it will be understood that changes in the details of the invention as disclosed may be made without departing from the spirit thereof or the scope of the appended claims.

We claim:

1. A pipe fitting comprising a sleeve, and a pair of spaced annular shoulders extending generally radially of said sleeve, said shoulders having free edges remote from the sleeve which are separate from each other, the ends of said sleeve being deformable radially on forcing said shoulders toward each other.

2. A pipe fitting comprising a sleeve, and an enlargement intermediate the ends of said sleeve, said enlargement being undercut on both sides and having a peripheral V-shaped groove, defining radial shoulders diverging away from the sleeve, the ends of the sleeve being deformable radially on forcing said shoulders toward each other.

3. A pipe fitting comprising a sleeve, and a pair of annular shoulders integral with said sleeve and intermediate the ends thereof but spaced from each other at their extremity remote from the sleeve, said sleeve having circumferentially spaced slots extending from each end to the adjacent shoulder whereby said shoulders, on being forced toward each other, bodily bend the segments of said sleeve radially outward.

HOWARD W. RUSSELL.
HENRY A. H. PRAY.